Feb. 2, 1960        M. R. NIELSEN        2,923,388
ONE-WAY CLUTCH
Filed Dec. 17, 1954        2 Sheets-Sheet 1
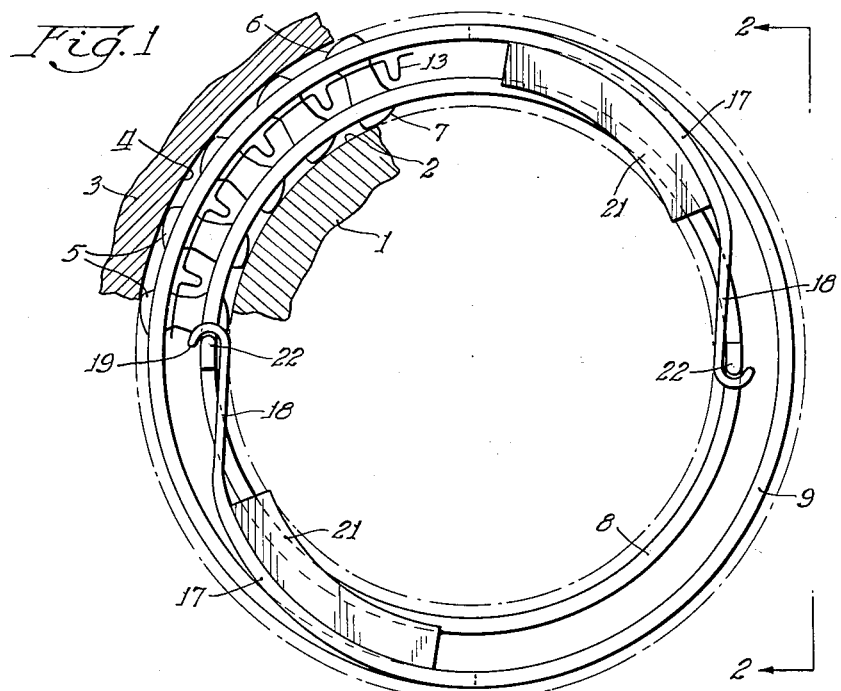
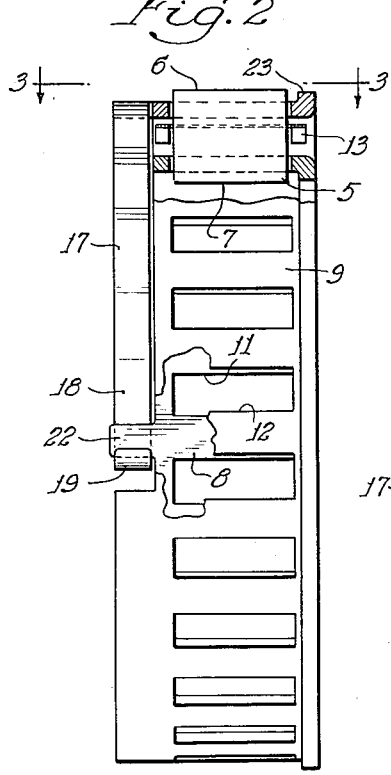
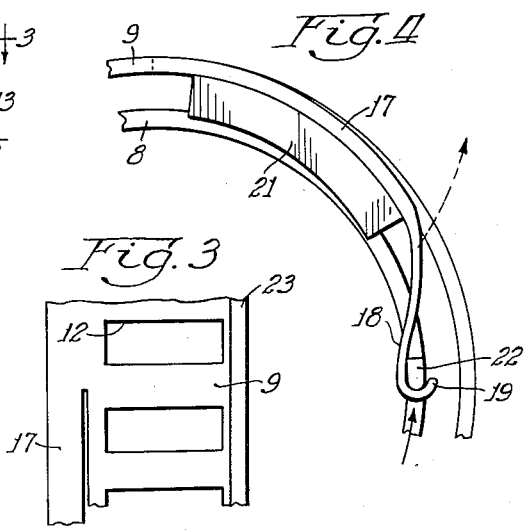
Inventor:
Milton R. Nielsen
By: Donald W. Banner

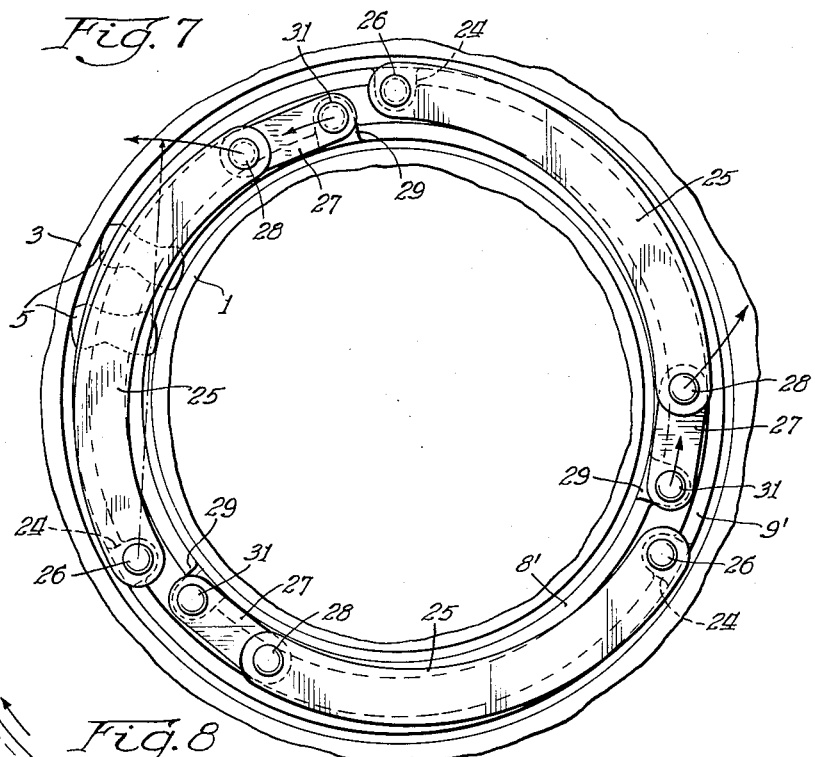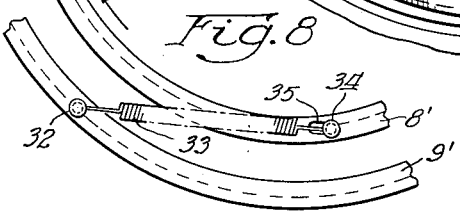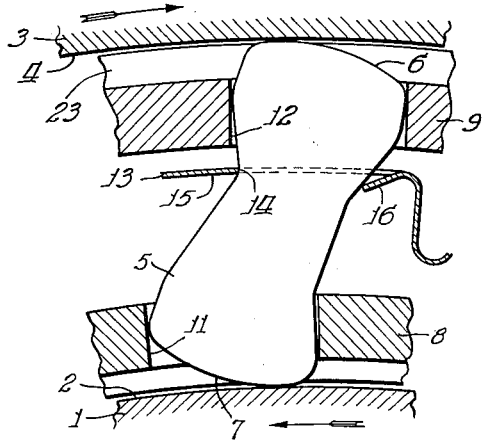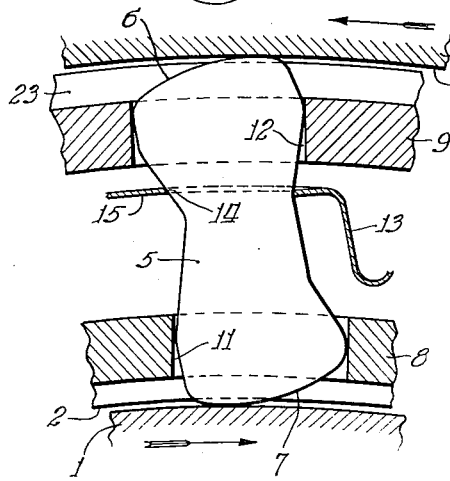

United States Patent Office 2,923,388
Patented Feb. 2, 1960

2,923,388

ONE-WAY CLUTCH

Milton R. Nielsen, Lombard, Ill., assignor to Borg-Warner Corporation, Chicago, Ill., a corporation of Illinois Application December 17, 1954, Serial No. 476,031

12 Claims. (Cl. 192—45.1)

This invention relates to one-way engaging devices, and more particularly one-way engaging devices incorporating sprags or grippers disposed between a pair of races, the grippers being spaced apart and controlled by a pair of radially spaced cages, means being provided to disengage the sprags completely from one of the races under certain conditions.

In certain installations substantial wear is experienced in sprag clutches during their overrunning condition; for example, installations in which sprag clutches are used to couple the starting motor to the main turbine of a jet engine, after the turbine becomes self-sustaining at approximately its idling speed, the starter is stopped and the turbine speed increases to normal running speed with the sprag clutch in overrunning condition. With turbine speeds of 8,000 to 35,000 r.p.m.—depending upon the size of the unit—a severe wear problem results from the free wheel drag of the sprags against the inner race. It is, therefore, desirable to lift the sprags off the inner race and eliminate this wear at high speeds; it is also necessary that they again be in contact and ready to carry torque when the main turbine falls below its idling speed so that the starter can be used to assist in restarting this turbine after a flame failure.

In order to accomplish this purpose, it has been found to be particularly desirable to employ a sprag clutch incorporating a plurality of spaced sprags which extend through suitable openings in a pair of radially spaced cages, the outer cage being provided with one or more centrifugally responsive weights, the resultant of the centrifugal forces being coupled to the inner cage so as to produce relative cage rotation between the cages.

Therefore, it is one object of the present invention to provide a one-way engaging device incorporating sprags and a pair of radially spaced cages in which means are provided to effect relative rotation of the cages in a predetermined direction in response to speed of rotation of the unit to move the sprags away from one of the races.

It is another object of the present invention to provide a device in accordance with the preceding object in which a weight is suitably attached to an outer cage, means being provided to effect outward movement of the weight in response to centrifugal force and effect movement of the inner cage in response to such weight movement.

Another object of the present invention is a provision of an improved one-way engaging device in accordance with the preceding objects in which an integral extension of the outer cage is employed to mount the centrifugally responsive weight and connect such weight to the inner cage.

Another object of the invention is to provide an improved one-way engaging device in accordance with the preceding objects in which the movement of the auxiliary centrifugally responsive weight effects a movement of the inner cage and a consequent movement of the sprags which lifts the sprags out of contact with the inner race, the sprag movement occurring against the bias of a sprag-energizing spring.

Another object of the present invention is to provision of an improved one-way engaging device employing an inner and an outer cage, a plurality of sprags disposed within, and extending through, suitable openings in both of the cages in which a series of external centrifugal weights are provided which are pivoted on the outer cage by means of pivot pins, the pivot pins also being connected to one end of connecting links, the opposite ends of which are connected by suitable means to the inner cage.

A further object of the present invention is the provision of a one-way engaging device in accordance with the preceding objects which additional, auxiliary springs have been provided which tend to return the inner cage to the position in which the sprags engage both of the races.

Other objects and features of the invention will be readily apparent to those skilled in the art from the specification and appended drawings illustrating certain preferred embodiments in which:

Figure 1 is a partial view in side elevation of a one-way engaging device incorporating the principles of the present invention in which certain parts are broken away to facilitate the understanding thereof;

Figure 2 is a sectional view along the plane of line II—II of Figure 1 in which certain parts have been broken away for the purpose of better illustration;

Figure 3 is a partial sectional view along the plane of line III—III of Figure 2;

Figure 4 is a view illustrating the centrifugal weight of Figure 1 in a moved position as in response to centrifugal force;

Figure 5 is a partial view illustrating the sprags employed in the one-way engaging device in their normal engaged condition;

Figure 6 is a view similar to Figure 5 showing their sprags in their normal disengaged position;

Figure 7 illustrates a modification of the present invention, the view being of a one-way engaging device incorporating the present invention which is shown in side elevation;

Figure 8 is a partial view illustrating a further modification of the invention.

Referring now to the form of the present invention illustrated particularly in Figures 1 through 4, there is illustrated a one-way engaging device comprising an inner race 1 having an annular surface 2 to be engaged by the sprags, and an outer race 3 having a surface 4 in annular form to be engaged by the sprags. Disposed between the surfaces 2 and 4 are a plurality of circumferentially spaced sprags 5, each of which is provided with radially spaced, curved, race-engaging surfaces 6 and 7. The surfaces 6 and 7 of the sprags 5 are curved about spaced centers so that upon rotation of the races in the direction of the arrows in Figure 5 and movement of the sprags to the position illustrated in Figures 1 and 5, the sprags 5 wedgingly connect the races together for unitary rotation. Rotation of the sprags to the disengaged condition illustrated in Figure 6, by virtue of relative race rotation in the direction indicated by the arrows on Figure 6, results in the sprags permitting relative rotation of the races in that direction.

Means are provided for spacing and effecting common angular movement of the sprags 5 which comprise an inner angular cage 8 and an outer angular cage 9. The inner cage 8 is provided with a plurality of circumferentially spaced openings 11 through which the sprags 5 extend to engage the inner race 1. The outer cage 9 is provided with a plurality of circumferentially spaced openings 12 through which the outer ends of the sprags 5 extend to engage the outer race 3. The dimensions of the sprags 5, and the dimensions of openings 11 and 12 are such that movement of the sprags 5 from the engaged position of Figure 5 to the disengaged position of Figure 6, and vice versa, results in relative rotation of the cages 8 and 9. These dimensions are also such that the sprags 5 are throughout this range of tilting movement substantially always in contact with the sides of the openings 11 and 12 which are circumferentially spaced with only a bearing clearance between the sprags and the sides of the openings. This results in common angular movement of each and every one of the sprags throughout the operating range of the device.

In order to bias the sprags toward the position in which they wedgingly engage the races 1 and 3, there is also provided an energizing spring 13 of annular form, preferably fabricated of a suitable, resilient sheet material. The spring 13 is provided with a plurality of openings 14 therethrough, through which the sprags 5 extend. Each of the openings 14 is formed in part by a substantially straight, axially extending side 15, and opposed thereto is a resilient tab 16 integral with the spring 13, which engages the associated sprag to bias it toward engaging position with the races.

The particular one-way engaging device herein described is completely described and claimed in the copending application of Harry P. Troendly et al., Serial No. 379,534 filed September 11, 1953, now Patent No. 2,824,636, dated February 25, 1958, and entitled "One-Way Clutch."

The cages 8 and 9 are formed of metal, and the cage 9 is provided with a plurality of integral extensions 17 which, as shown in Figure 3, are split from the main body of the cage 9. Each extension 17 has its opposite or free end portion 18 reduced in thickness, the end 18 being curved inwardly toward the inner cage 8 and provided at 19 with a reverse bent portion. Mounted upon each portion 17 by suitable means (not shown) is a weight 21.

The inner cage 8 is provided with an integral extension 22 about which the end 19 of the adjacent portion 17 is hooked. This construction is particularly evident in Figures 1, 2 and 4. As best shown in Figure 1, there are a plurality of weights 21 respectively affixed to the extensions 17 on the outer cage 9 which are hooked by means of the ends 19 to a plurality of extensions or lugs 22 upon the inner cage 8.

In the operation of the structure illustrated in Figures 1 through 4 particularly, when the races move toward the relative direction indicated in Figure 5, the sprags 5 wedgingly engage between the races so that they rotate together. When the races move in the relative directions indicated by the arrows on Figure 6, the sprags 5 are moved to the disengaged position in which the aforementioned relative rotation may take place. When the outer race rotates relative to the inner race in the direction indicated by the arrows in Figure 6, it is said to overrun in which condition the light frictional engagement between the sprags 5—or more particularly, the light frictional engagement of the race engaging surface 6 of the sprags 5—with the outer race 3 causes the sprags 5 and the cages 8, 9 and 13 to tend to move with the outer race 3. The flange 23 provided on the outer cage 9 also tends to assist in this type of movement. As a result, at substantial speeds of the outer race, the race-engaging surfaces 7 on the sprags 5 would be dragged along the inner race 1, and although this is a condition of only light engagement, substantial wear of the sprags 5 and the race 1 occurs. With the device of the present invention, however, this wear is substantially eliminated. This is accomplished by means of the weights 21, which, moving with the outer cage 9 when the outer race 3 is overrunning, tend to move outwardly at substantial speeds of the race 3, away from the position illustrated in Figure 1 to the position in Figure 4. When this occurs, as shown in Figure 4, the ends 19 of the portions 17 on the outer cage 9 effect movement of the inner cage 8—by virtue of their connection to the lugs 22—in such a direction that the race-engaging surfaces 7 on the sprags 5 are lifted free from engagement with the inner race 1. As a result, the sprags 5 and the inner race 1 do not experience the substantial wear to which they would otherwise be subjected. It will be obvious, that as long as the outer race 3 overruns at substantial speeds, the sprags 5 will be maintained in this position, free from engagement with the inner race 1.

As the outer race slows down, it will be obvious that the centrifugal force operative upon the weights 21 will decrease, whereupon the weights 21 will tend to return toward the position illustrated in Figure 1. As this speed decreases, the cage 8 will be moved in a clockwise direction (from the view of Figure 6) relative to the cage 9 inasmuch as the weights 21 will no longer supply a substantial force through the ends 21 of the portions 17, and by virtue of the fact that the sprags 5 are biased away from the disengaged position illustrated in Figure 6 by the tabs 16 on the energizing spring cage 13. When the sprags return to a position in which the race engaging surfaces 7 reengage the inner race 1 the device will operate in its normal manner.

It is important to notice that when the sprags wedgingly engage between the races 1 and 3, as shown in Figure 1, the forces transmitted by the sprags will be such that regardless of the speed of the structure, the weights 21 cannot effect the disengagement of the device.

It will also be obvious that by varying the weights 21 as to mass and size, various "lift-off" and "reengage" conditions may be effected.

Considering now the modification of the present invention illustrated particularly in Figure 7, that structure employs a plurality of sprags 5 which are biased to engaging position between the races 1 and 3 by virtue of the biasing spring 13. Cages 8' and 9' are provided which have openings through which the sprags extend, as previously described. In the modification of Figure 7, however, the outer cage 9' is provided with a plurality of "bent over" tabs 24 and elongated, curved weights 25 are pivoted to the tabs 24 by means of pins 26. To the opposite ends of each of the weights 25 there is pivoted a connecting link 27 by means of a pin 28, the opposite of the links 27 being pivoted to tabs 29 on the inner cages 8' by means of pins 31. The connection between the weights 25 and the outer cage 9' permits pivotal motion of the weights 25 about the pins 26. Similarly, the pins 28 and 31 permit rotation of the members connected thereby. As a result, during overrunning of the outer race, the ends of the weights 25 connected to the links 27 will move outwardly, and will carry or force the links 27 to move therewith in view of the connection of the links 27 to the weights 25 by the pins 28. Such outward movement of the links 27 results in rotation of the inner cage 8' in counterclockwise direction relative to the outer cage 9' due to the connections of the links 27 to the tabs 29—integral with the inner cage 8' by virtue of the pins 31. Under such conditions, the sprags 5 will, as previously described, be lifted free from engagement with the inner race 1. When the speed of the outer race decreases sufficiently, the centrifugal force applied to the weights 25 will decrease whereby the spring cage 13, and more specifically, the tabs 16 thereon will force the sprags to return to engaged position with both of the races and will effect clockwise rotation of the cage 8' relative to the cage 9' to permit this engagement.

With respect to the particular modification illustrated in Figure 8, there is shown therein the inner cage 8' and the outer cage 9'. To the outer cage 9' there is affixed a pin 32. Attached to the pin 32 is one end of a spring 33, the opposite end of which is affixed to a pin 34 connected to the inner cage 8'. Preferably, the pin 34 is connected to the cage 8' by means of a lost motion connection 35. It will, therefore, be seen that the spring 33 will oppose the movement of the inner cage 8' when the weights 25 are effective to move the inner cage 8'. However, by virtue of the lost motion connection 35, this force of the spring 33 is not effective within the range of movement of the cage 8' relative to the cage 9' which is effected by virtue of the tilting of the sprags 5 alone—that is to say that the lost motion connection 35 is of such nature that the spring 33 is effective only when the cage 8' moves to its abnormal condition relative to the cage 9' by virtue of the outward movement of the centrifugal weights 25.

It will, therefore, be seen that the device of the present invention provides a simple, effective, foolproof and economical means for connecting together a pair of races upon one relative direction of rotation therebetween for permitting relative rotation of the races upon the opposite relative rotation therebetween, and for lifting the sprags employed free of one of the races when high speed overrunning of the other race occurs. It will also be seen that to vary the "lift-off" and "return" characteristics of the device, it is only necessary to vary the mass of the centrifugal weights employed and/or the disposition of such weights relative to the cages.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a one-way engaging device adapted for use between a pair of races, an inner cage, an outer cage, said cages being rotatable relative to said races and relative to each other means defining a plurality of circumferentially spaced openings in said cages, a plurality of sprags respectively extending through an opening in said outer cage and through an opening in said inner cage, means defining race-engaging surfaces on said sprags constructed and arranged to wedgingly engage between said races upon relative rotation therebetween in one direction and to permit relative rotation therebetween in the opposite direction, means constructed and arranged to disconnect said sprags from one of said races during predetermined overrunning conditions of said device comprising centrifugally responsive means carried by one of said cages, and means adapted to connect said centrifugally responsive means to the other of said cages during said predetermined conditions.

2. The device defined in claim 1 in which said centrifugally responsive means are mounted to said outer cage.

3. In a one-way engaging device adapted for use between a pair of races, an inner cage, an outer cage, said cages being rotatable relative to said races and relative to each other means defining a plurality of circumferentially spaced openings in said cages, a plurality of sprags respectively extending through an opening in said outer cage and through an opening in said inner cage, means defining race engaging surfaces on said sprags constructed and arranged wedgingly to engage between said races upon relative rotation therebetween in one direction and to permit relative rotation therebetween in the opposite direction, means constructed and arranged to disconnect said sprags from one of said races during predetermined overrunning conditions of said device comprising centrifugally responsive means carried by one of said cages, said outer cage being provided with a plurality of symmetrically arranged and resilient integral extensions, said centrifugally responsive means being mounted upon said extensions, and means connecting said centrifugally responsive means to the other of said cages during said predetermined conditions.

4. In a one-way engaging device adapted for use between a pair of races, an inner cage, an outer cage, said outer cage being provided with a plurality of symmetrically arranged and resilient integral extensions, means defining a plurality of circumferentially spaced openings in said cage, a plurality of sprags respectively extending through an opening in said outer cage and through an opening in said inner cage, means defining race engaging surfaces on said sprags constructed and arranged wedgingly to engage between said races upon relative rotation therebetween in one direction and to permit relative rotation therebetween in the opposite direction, means constructed and arranged to disconnect said sprags from one of said races during predetermined overrunning conditions of said device comprising centrifugally responsive means mounted upon said extensions, said extensions being provided with return bent portions engageable with suitable tabs provided on said inner cage.

5. The device defined in claim 2 in which spring means are provided to bias said sprags in a direction opposite to the direction of bias applied to said sprags by said centrifugally responsive means.

6. In a one-way engaging device adapted for use between a pair of races, an inner cage, an outer cage, said cages being rotatable relative to said races and relative to each other means defining a plurality of circumferentially spaced openings in said cages, a plurality of sprags respectively extending through an opening in said outer cage and through an opening in said inner cage, means defining race engaging surfaces on said sprags constructed and arranged to wedgingly engage between said races upon relative rotation therebetween in one direction and to permit relative rotation therebetween in the opposite direction, weight means mounted on one of said cages and movable relative thereto in response to centrifugal force, and means adapted to effect relative movement between said cages to disengage said sprags from one of the races in response to movement of said weight means under the influence of centrifugal force.

7. The device defined in claim 6 in which spring means are provided to bias said sprags toward engagement with both of the races.

8. In a one-way engaging device adapted for use between a pair of races, an inner cage, an outer cage, means defining a plurality of circumferentially spaced openings in said cages, a plurality of sprags respectively extending through an opening in said outer cage and through an opening in said inner cage, means defining last-engaging surfaces on said sprags constructed and arranged to wedgingly engage between said races upon relative rotation therebetween in one direction and to permit relative rotation therebetween in the opposite direction, means constructed and arranged to disconnect said sprags from one of said races during predetermined overrunning conditions of said device comprising centrifugally responsive means carried by one of said cages, means adapted to connect said centrifugally responsive means to the other of said cages during said predetermined conditions, said outer cage being provided with a plurality of symmetrically arranged and resilient integral extensions, means mounting said centrifugally responsive means upon said extensions, means on said extensions defining return bent portions adapted to engage suitable tabs provided on said inner cage, and spring means for biasing said sprags in a direction opposite to the direction of bias applied to said sprags by said centrifugally responsive means.

9. The device defined in claim 8 in which the contacting edges of said sprags and said openings define means whereby contact therebetween will be maintained so that said sprags substantially fill said openings throughout the normal tilting range of the sprags.

10. In a one-way engaging device adapted for use between a pair of races, an inner cage, an outer cage, said cages being rotatable relative to said races and relative to each other, means defining a plurality of circumferentially spaced openings in said cages, a plurality of sprags respectively extending through an opening in said outer cage and through an opening in said inner cage, means defining race engaging surfaces on said sprags constructed and arranged wedgingly to engage between said races upon relative rotation therebetween in one direction and to permit relative rotation therebetween in the opposite direction, weight means pivotally mounted on one of said cages and movable relative thereto in response to centrifugal force, and means for effecting relative movement between said cages to disengage said sprags from one of the races in response to movement of said weight means under the influence of centrifugal force, said last-named means comprising link means pivotally connected at one end to said weight means and pivotally connected at the opposite end to the other of said cages.

11. In a one-way engaging device adapted for use between a pair of races, an inner cage, an outer cage, said cages being rotatable relative to said races and relative to each other, means defining a plurality of circumferentially spaced openings in said cages, a plurality of sprags respectively extending through an opening in said outer cage and through an opening in said inner cage, means defining race engaging surfaces on said sprags constructed and arranged wedgingly to engage between said races upon relative rotation therebetween in one direction and to permit relative rotation therebetween in the opposite direction, weight means pivotally mounted on one of said cages and movable relative thereto in response to centrifugal force, and means for effecting relative movement between said cages to disengage said sprags from one of the races in response to movement of said weight means under the influence of centrifugal force, said last-named means comprising link means pivotally connected at one end to said weight means and pivotally connected at the other end to said inner cage.

12. In a one-way engaging device adapted for use between a pair of races, an inner cage, an outer cage, said cages being rotatable relative to said races and relative to each other, means defining a plurality of circumferentially spaced openings in said cages, a plurality of sprags respectively extending through an opening in said outer cage and through an opening in said inner cage, means defining race engaging surfaces on said sprags constructed and arranged wedgingly to engage between said races upon relative rotation therebetween in one direction and to permit relative rotation therebetween in the opposite direction, weight means pivotally mounted on one of said cages and movable relative thereto in response to centrifugal force, means for effecting relative movement between said cages to disengage said sprags from one of the races in response to movement of said weight means under the influence of centrifugal force, said last-named means comprising link means pivotally connected at one end to said weight means and pivotally connected at the opposite end to the other of said cages, and spring means adapted to engage said sprags toward engagement with both of said cages.

References Cited in the file of this patent

UNITED STATES PATENTS

| 2,173,604 | Dodge | Sept. 19, 1939 |
| 2,385,799 | Dodge | Oct. 2, 1945 |
| 2,683,509 | Jandasek | July 13, 1954 |

FOREIGN PATENTS

| 1,095,050 | France | Dec. 15, 1954 |